United States Patent
Mitchell et al.

(10) Patent No.: US 7,008,528 B2
(45) Date of Patent: Mar. 7, 2006

(54) PROCESS AND SYSTEM FOR CONTINUOUSLY EXTRACTING OIL FROM SOLID OR LIQUID OIL BEARING MATERIAL

(76) Inventors: Allen R. Mitchell, 1034 Wakefield Pl., Brandson, MS (US) 39047; Louis E. Routier, III, 200 Ringo Cocke Rd., Schriever, LA (US) 70395

(*) Notice: Subject to any disclaimer, the term of this patent is extended or adjusted under 35 U.S.C. 154(b) by 386 days.

(21) Appl. No.: 10/101,588

(22) Filed: Mar. 21, 2002

(65) Prior Publication Data
US 2002/0134704 A1    Sep. 26, 2002

Related U.S. Application Data

(60) Provisional application No. 60/278,291, filed on Mar. 23, 2001.

(51) Int. Cl.
  *C10G 1/04*  (2006.01)
  *C11B 1/10*  (2006.01)

(52) U.S. Cl. .................. 208/390; 208/391; 208/400; 208/428; 208/952; 208/13; 426/417; 554/9; 554/11; 554/12; 554/16; 134/40

(58) Field of Classification Search ............... 208/390, 208/391, 400, 428, 952, 13; 426/417; 554/9, 554/11, 12, 16; 134/40
See application file for complete search history.

(56) References Cited

U.S. PATENT DOCUMENTS

| | | | |
|---|---|---|---|
| 1,802,533 A | 4/1931 | Reid | |
| 2,564,409 A | 8/1951 | Rubin | |
| 3,261,690 A | 7/1966 | Wayne | |
| 4,331,695 A | 5/1982 | Zosel | |
| 4,399,025 A | 8/1983 | Fletcher et al. | |
| 4,977,839 A | 12/1990 | Fochtman et al. | |
| 5,011,594 A * | 4/1991 | Haeffner et al. | ............ 208/320 |
| 5,066,386 A | 11/1991 | Paspek et al. | |
| 5,256,257 A | 10/1993 | Schiel | |
| 5,281,732 A | 1/1994 | Franke | |

* cited by examiner

*Primary Examiner*—Walter D. Griffin
(74) *Attorney, Agent, or Firm*—Peter A. Borsari

(57) ABSTRACT

A process for continuously extracting oil from a solid or liquid oil-bearing material comprises (a) removing air from the extraction system, (b) introducing an inert gas into the extraction system at a pressure sufficient to maintain a normally gaseous solvent in liquid state, (c) introducing an oil-bearing material into a silo, (d) passing the oil-bearing material from the to a jet pump mixing device, (e) introducing a liquified normally gaseous solvent into the jet pump mixing device, (f) mixing the oil-bearing material and the solvent in the jet pump mixing device for a time sufficient to permit complete wetting of oil-bearing material by the solvent to form a mixture, (g) heating the mixture to near supercritical conditions; (h) passing the mixture through an extractor having a screw conveyor adapted to rotate at a first rpm range and a centrifugal drum adapted to rotate at a second rpm range, (i) treating the mixture within the extractor in such a manner that supercritical temperature and pressure are attained, wherein treating the mixture includes a combination of increasing the rpms of the centrifugal drum, increasing the temperature inside the extractor and increasing the inert gas pressure inside the extractor, (j) extracting oil from the mixture by pressure diffusion provided by the combination of increased rpms, increased temperatures and increased inert gas pressures at supercritical conditions, (j) removing liquids extracted from the mixture through a liquids exit port, and (k) removing solids extracted from the mixture through a solids exit port.

27 Claims, 13 Drawing Sheets

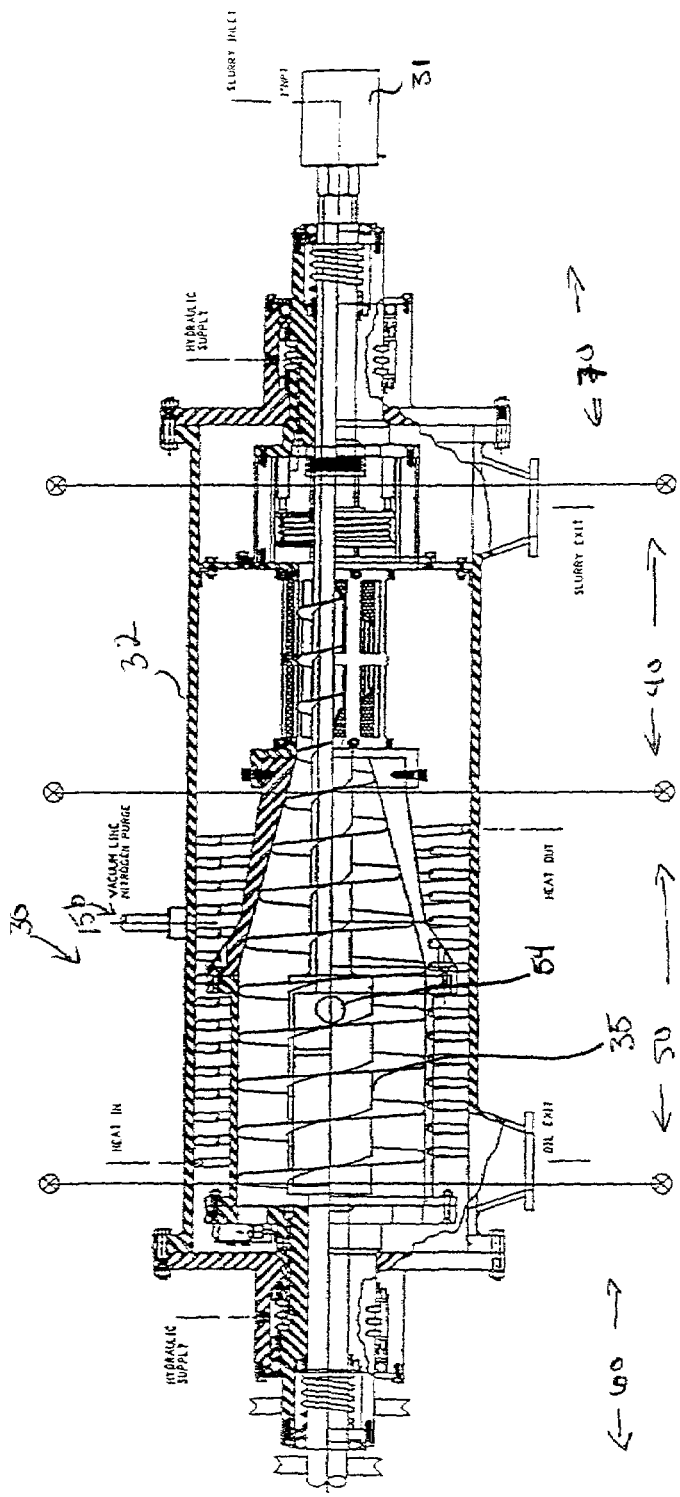

PROCESS AND SYSTEM FOR CONTINUOUSLY EXTRACTING OIL FROM SOLID OR LIQUID OIL BEARING MATERIAL

RELATED APPLICATION INFORMATION

This application claims the benefit of priority of U.S. patent provisional application Ser. No. 60/278,291, filed in the United States Patent & Trademark Office on Mar. 23, 2001 in the names of Allen R. Mitchell and Louis E. Routier, III.

FIELD OF INVENTION

The present invention relates to a fast and efficient process for continuously extracting oil from solid or liquid oil-bearing material and/or chemical contaminants. Volatile organic chemicals and oil from soils, slurries, sludges, and emulsions are extracted in a high speed centrifugal extractor specifically designed for normally gaseous solvents at supercritical temperatures and pressures. In particular, in a first embodiment, the present invention relates to the solvent extraction of oil-containing vegetable matter, such as rice bran, with an efficient continuous process for effecting such extraction by means of a normally gaseous hydrocarbon solvent under subcritical and supercritical conditions. In a second embodiment, the present invention relates to the solvent extraction of hydrocarbon-containing solids, sludge, slurries and emulsions which requires little or no modification of the first embodiment other than the choice of solvents.

BACKGROUND OF THE INVENTION

In prior industrial operations, hexane and heptane solvents have been used in the solvent extraction of oil-containing vegetable matter, for example oilseeds and oil-yielding plants. The extraction apparatus included vertical extraction towers, screw extractors and bucket extractors. Most of the equipment used in the extraction of oil-yielding vegetable material and oilseed was configured to work in a counter-current manner. With current equipment, several extraction stages are necessary in order to circulate the micella and attain sufficient wetting of the material to be extracted, thereby requiring the use of a higher proportion of solvent. In addition, overall energy consumption inherent in previous slurry separations has been excessive, if not prohibitive. An example of such a slurry separation process is disclosed in U.S. Pat. No. 2,564,409 to Rubin, issued Aug. 14, 1951.

Beyond the problem of sufficient wetting of the raw materials, another difficulty encountered in liquid slurry operations is the separation of the solvent from the extracted oil and defatted meal. Separation of normally liquid solvents from oil involves a distillation process requiring large amounts of heat. Complete removal of solvents, such as hexane, from the solids is practically impossible by conventional steam stripping techniques. Analysis of conventional soybean extractions using hexane revealed a presence of a minimum of 10% by weight of hexane in the meal after steam stripping.

Other teachings in the art have recognized the use of normally gaseous solvents at both supercritical and subcritical conditions, such as carbon dioxide and propane. For a typical solvent extraction process using propane at room temperature, the operating pressure must exceed 125 psi to remain in liquid state and even higher if temperatures are elevated. One example is described in U.S. Pat. No. 1,802,533 to Reid, issued Apr. 28, 1931, where an extraction vessel is filled with raw material at which a liquefied gaseous solvent is supplied and after extraction the micella or solvent extracted oil is distilled by heating. In U.S. Pat. No. 5,281,732 to Franke, issued Jan. 25, 1994, the raw material is introduced into the extraction vessel, a vacuum is pulled on the vessel to exhaust any air, after which nitrogen is introduced to pressurize the extraction vessel to allow the propane solvent to remain in its liquid state.

With liquefied gaseous solvent extraction processes, the introduction of raw material into the extraction chamber as well as removal of the solid material up to this time have been complicated at high levels of pressure and has been limited to batch operations. Usually, two or more extraction vessels are operated in parallel so that one can be emptied and filled while another extraction is being carried out. This operation limits the speed and economy of the extraction to the ability of the personnel performing the exchange as opposed to a continuous process. Another limiting factor to the economy and speed of operation is the problem of maintaining the pressure in the extraction zone. During the removal of the solvent and oil, the extraction zone must be pressurized to prevent unnecessary evaporation of the solvent, which in turn, may freeze the extracted material. This "freezing" results in the operating personnel having to hammer out the frozen material and possibly causing damage to the extraction vessel. Although the material is frozen, the solvent is readily removed from the solid residue and the extracted oil due to its inherent vaporization when the pressure is reduced.

Difficult-to-extract oil-bearing plant material, such as peanuts, rice and almonds, which are preferred in the whole grain state, require a rather complicated extraction and recovery processes such as the supercritical extraction disclosed in U.S. Pat. No. 4,331,695 to Zosel, issued May 25, 1992. At supercritical temperatures and pressures, low molecular weight liquid gaseous solvents diffuse particularly easily through cell membranes, thus making it possible to extract oils and fats selectively. From 150° F. to 200° F., pressures for propane can range from 400 to 600 psi. At these conditions, the solvent selectively extracts light colored fatty matter and rejects undesirable color bodies, phosphatides and gums. When operated at supercritical conditions, the solvent used has the property of causing a separation into two phases, the light phase containing the light colored fats and oils and the heavier phase containing undesirable materials. Thus, by varying the temperature and pressure, a wide range of extraction and phase separation can be achieved. A disadvantage of supercritical extraction is the extreme pressures needed for extraction depending on the solvent used. For example, the pressure of carbon dioxide as a solvent can range from 5,000–10,000 psi. Special high pressure vessels must be designed to handle such pressure which limits the extraction process to a batch operation.

One of the more troublesome oil bearing materials is rice bran. Although rice is one of the most plentiful and nutritious food sources, it is one of the least utilized, primarily because of the difficulty in processing of the bran. Rice bran contains from about 15 to 20% oil and is not considered suitable for human consumption if high levels of Free Fatty Acids (FFA) are present in the oil. High FFA also can cause a high refining loss in processing rice bran oil (RBO). To halt the formation of FFA after milling, some bran in recent years has been stabilized with a high pressure extruder. Thus, to stabilize rice bran for the food ingredient market, many large rice mills in the United States recently have purchased extruder equipment that can be used to stabilize the bran for RBO extraction if necessary. But it has been reported that the use of such extrusion-stabilized bran results in a darker crude oil. Because of this problem, more than the normal amount of bleaching clay is required, which results in additional refining losses.

Japan is recognized as a major world leader in RBO processing, with significant long-term technical experience in processing edible grade RBO. The Japanese processors have traditionally extracted the oil within a day of milling the rice to limit the amount of FFA for economical refining of edible oil. Most of the RBO extracted in Japan is reportedly done with continuous rotocell extractors.

The quality of oil contained in freshly milled rice bran declines rapidly due to the hydrolysis of lipids that is activated in the process of milling. Hydrolysis of the lipids results in the immediate development of FFA, which can increase to as much as 10 to 15% within a day depending on temperature and humidity. Only crude rice bran oil with less than 10% FFA is considered economical to refine for edible use with conventional alkali refining. For economical recovery of edible RBO, the crude rice bran oil (CRBO) must be extracted before or immediately after milling, or the bran must be stabilized. Degumming is required immediately after extraction if the CRBO is to be stored for a long time prior to refining.

Rice and rice bran can be stabilized prior to bran removal by extractive milling of the rice in the presence of an organic solvent as described in U.S. Pat. No. 3,261,690 to Wayne, issued Jul. 19, 1966. Wayne discloses a solvent extraction process using hexane as the solvent during the milling operation, thereby removing the oil which mitigates any enzyme action on the oil. This process also uses a steam heated desolventizer commonly used in solvent extraction of cottonseed meal and soybean meal.

With respect to the extraction of oil from hydrocarbon-containing solids, the first application of solvent extraction in a refinery was the recovery of heavy lube oil base stocks by propane deasphalting. Deasphalting was developed more than forty years ago as a joint effort of Kellogg, Standard Oil Co. of New Jersey, Standard Oil Co. of Indiana and Union oil Co. of California. In the process of deasphalting oil, the selection of a solvent or solvent mixture seriously effects the economics, flexibility, and performance of the plant. The solvent must be suitable, not only for the extraction of the desired oil but also for control of the yield and quality.

Propane deasphalting has been used for several decades in the manufacture of lubricating oils and is, by far, the most selective solvent among the light hydrocarbons. At temperature ranges of 100° F. to 150° F., paraffins are completely soluble in propane while asphaltic and resinous compounds precipitate. The rejection of these compounds drastically reduce the metals and nitrogen content in the deasphalted oil and also the rejection of condensed-ring aromatics. Although deasphalting with propane has the best quality, the yield is usually less than with a heavier solvent. In order to recover more oil from vacuum-reduced crude, mainly for catalytic cracking feed, higher molecular weight solvents such as butane and even pentane have been utilized. When a unit is required to handle a variety of feedstocks, a dual or multiple solvent can provide some flexibility. For instance, a mixture of propane and n-butane would suit both heavy feed and lighter feed. By adjusting the solvent composition the desirable product quality is obtainable.

Although propane has been used successfully in extracting oils, liquid solvents have been utilized as described in U.S. Pat. No. 4,399,025 to Fletcher et al., issued Aug. 16, 1983. The Fletcher et al. process removes impurities from heavy and light lube fractions using tetrahydrofurfuryl alcohol in an extraction column. The tetrahydrofurfuryl alcohol is then removed from the extracted oil by steam distillation and stripping. Another example of liquid solvent extraction is described in U.S. Pat. No. 5,256,257 to Schiel, issued Oct. 26, 1993, which provides a continuous evaporation process for drying water-wet waste solids and sludge using a paraffin oil solvent. Schiel involves the mixing of solids and sludge with a paraffin oil solvent in multiple evaporator stages and finally separating most of the solvents from the solids by centrifugation. Both of these patents use a normally liquid solvent in combination with some type of steam heat for evaporation and separation of solvent which results in problems similar to the complete wetting and removal of the solvent associated with liquid solvent extraction of vegetable matter.

A slightly different example of a process for separating contaminants from soils and sludge is described in U.S. Pat. No. 4,977,839 to Fochtman et al., issued Dec. 18, 1990. Fochtman et al. requires the use of indirect heat from a rotary kiln or dryer, thereby subjecting the oil-containing material to temperatures effective to volatilize the contaminants with continuous removal of vapors to effect a desired degree of separation. This process has two drawbacks associated with it. First, the required high temperatures needed to volatize the contaminants into vapors is a potential fire hazard. Second, vaporizing the contaminants increases the potential release of contaminants into the air.

U.S. Pat. No. 5,066,386 to Paspek et al., issued Nov. 19, 1991, discloses a process of extracting oil from oil-water emulsions containing suspended solid particles through the use of a liquefied hydrocarbon gases at elevated pressures. In Paspek et al., the stability of oil-water-solid emulsions is a function of the composition; that is, the ratio (relative amounts) of oil, water, and solids in the mixture, as well as the type of oil and solids. The stability of the emulsion increases with the presence of suspended solids. The breaking of such emulsions requires alteration of this ratio. Removal of solids by filtration has a tendency to break the emulsion, but since the emulsion is so viscous, filtration is extremely difficult. In addition, centrifugation of oil-water solid emulsions results in rather poor separation.

Despite that teachings of the prior art, a need still exists for a process and apparatus for continuously extracting oil from oil-bearing materials which is suitable for both vegetable matter and hydrocarbon-containing solids, sludges, slurries and emulsions. Such a process and apparatus should utilize liquified normally gaseous hydrocarbon solvents at supercritical and/or subcritical temperature and pressure ranges. Such a process an apparatus also should eliminate the the problems of complete solvent removal associated with liquid slurry operations using normally liquid solvents, the inherent operating and freezing problem associated with the use of normally gaseous solvents, and the inherent operating problems associated with batch operations that use liquid normally gaseous solvents. In addition, such a process and apparatus for continuously extracting oil from oil-bearing material should provide for greater efficiency in the wetting of the oil-bearing material, should simultaneously separate solid extracted matter from the liquids, such as oils, water, and solvent, and should enable phase separation of the dense phases from the less dense phases, thereby selectively extracting and separating the light colored matter from undesirable components and eliminating desolventizer steps, toaster operations and commuting operations. Moreover, such a process and apparatus should enable grains, such as rice, almonds, soybeans, peanuts and the like to be extracted whole. Further, such a process and apparatus should allow for the extraction and milling of rice in the presence of a liquefied normally gaseous solvent, thereby eliminating the formation of free fatty acids (FFA) and the need for rice bran stabilizers and thereby selectively extracting oils lighter in color to produce a superior quality oil.

SUMMARY OF THE INVENTION

Accordingly, it is an object of the present invention to provide a process and system for continously extracting oil from oil-bearing material by utilizing liquified, normally gaseous, hydrocarbon solvents at the supercritical and/or subcritical temperature and pressure ranges.

It is also an object of the present invention to provide a process and system for continously extracting oil from oil-bearing material which eliminates the problems of complete solvent removal associated with liquid slurry operations using normally liquid solvents, the inherent operating and freezing problem associated with the use of normally gaseous solvents, the inherent operating problems associated with batch operations that use liquid normally gaseous solvents.

It is an additional object of the present invention to provide a process and system for continously extracting oil from oil-bearing material, wherein the oil-bearing material is oil-containing vegetable matter.

It is a further object of the present invention to provide a process and system for continously extracting oil from oil-bearing material wherein the oil-bearing material is hydrocarbon-containing sludges, slurries, soils and emulsions.

It is another object of the present invention to provide a process and system for continously extracting oil from oil-containing vegetable material by introducing the oil-containing vegetable matter with the liquefied normally gaseous solvent and/or normally liquid co-solvents in such a manner as to provide efficient wetting of the oil-containing vegetable matter.

It is yet another object of the present invention to provide a process and system for continously extracting oil from oil-bearing material by introducing the oil-bearing material with the liquefied normally gaseous solvents and normally liquid co-solvents in such a manner as to provide complete wetting of the oil-bearing material, thereby avoiding the time-intensive and energy-intensive expense of using circulating pumps to obtain complete wetting.

It is still another object of the present invention to provide a process and system for continously extracting oil from oil-bearing material using a liquefied normally gaseous solvent, such as propane, butane, and/or carbon dioxide, wherein the temperature and pressure of the solvent(s) are increased from subcritical to supercritical without creating undue mechanical stress on the extraction system as associated with extrusion-type processes and supercritical processes of extremely high pressure.

It is another object of the present invention to provide a process and system for continously extracting oil from oil-bearing vegetable matter while simultaneously separating solid extracted matter, such as the miscella, from the liquids and normally gaseous liquid solvents.

It is another object of the present invention to provide a process and system for continously extracting oil from oil-bearing hydrocarbon-containing material while simultaneously separating solid extracted matter from the liquids such as oils, water, and solvents.

It is a further object of the present invention to provide a process and system for continously extracting oil from oil-bearing vegetable matter which enables a phase separation of the dense phases from the less dense phases, thereby selectively extracting and separating the light colored matter from the undesirable components such as color bodies, phosphatides and gums and eliminating desolventizer steps, toaster operations and commuting operations.

It is yet a further object of the present invention to provide a process and system for continously extracting oil from oil-bearing vegetable matter wherein grains, such as rice, almonds, soybeans, peanuts etc., can be extracted whole.

It is another object of the present invention to provide a process and system for continously extracting oil from oil-bearing rice material which allows the simultaneous extraction and milling of rice in the presence of a liquefied normally gaseous solvent, thereby eliminating the formation of free fatty acids (FFA) and the need for rice bran stabilizers and thereby selectively extracting oils lighter in color to produce a superior quality oil.

It is yet another object of the present invention to provide a process and system for continously extracting oil from oil-bearing rice material which controls the rate of the rice milling operation and the flow of solid matter and which provides a means of separating and controlling the flow of liquid using hydraulically actuated devices, thereby eliminating the introduction of air into the system and thus eliminating a potential fire hazard.

It is still another object of the present invention to provide a process and system for continously extracting oil from oil-bearing vegetable material which is capable of interchanging the milling and feeding mechanism, thereby providing alternatives to milling speed and efficiencies.

It is an additional object of the present invention to provide a process and system for continously extracting oil from oil-bearing material which is capable of breaking agglomerations or prevent the packing of solids by producing a continuous motion of solids through the extraction mechanism.

It is yet another object of the present invention to provide a process and system for continously extracting oil from oil-bearing material to provide a means for eliminating the extraction of lubricating oils from mechanical bearings by the strategic location of bearings and seals and the purging of said bearings, seals and the extraction mechanism with an inert gas, thereby avoiding bearing failure and eliminating a potential fire hazard.

Additional objects, advantages and novel features of the invention will be set forth in part of the description which follows, and in part will become apparent to those skilled in the art upon examination of the following specification or may be learned by practice of the invention.

These and other objects of the present invention are accomplished by providing a process and system for continuously extracting oil from solid or liquid oil bearing material and/or chemical contaminants. Volatile organic chemicals and oil from soils, slurries, sludges, and emulsions are extracted by liquified normally gaseous solvents selected from propane, butane, pentane, and carbon dioxide mixtures thereof, in a high speed centrifugal extractor specifically designed for normally gaseous solvents at supercritical temperatures and pressures. The solid oil-bearing material is introduced into the system through rotary lock valves while liquid oil-bearing material is introduced into the system by jet pump nozzles. Once the oil-bearing material is introduced into the system, it is mixed with one or more solvents and pumped through one or more heat exchangers in order to increase the temperature and pressure to near supercritical conditions. The oil-bearing material is continuously pumped through these heat exchangers to the extractor. The extractor is control-heated by an integrated heat exchanger, while the entire system is pressurized by an inert gas, such as nitrogen or carbon dioxide, to prevent oxygen from being introduced into the system and to maintain the state of the solvent. The normally gaseous solvent does not reach supercritical pressure until it reaches the extractor. As the solvent and oil-bearing material mixture enters the high speed rotating centrifugal drum inside the extractor and due to the inherent essence of centrifugal forces, the solvent reaches supercritical pressure, while the pressure outside of the drum is held at a constant safe pressure. The oil-bearing material is extracted continuously and separated inside the extractor by the centrifugal drum and a screw conveyor. The solid material is conveyed by the screw conveyor to a first hydraulically operated exit port; oils, chemical contaminants, solvent and water exit at a second hydraulically operated exit port, opposite the first exit port. The exit ports, which are hydraulically operated by external controls, utilize a compatible oil instead of air to prevent the possible introduction of air into the system, thus preventing a potential fire hazard. The solid material, being stripped of its oil or organic contaminates, is pushed up a cone in the high speed rotating centrifugal drum by the screw conveyor, thereby draining the solids. The solids continue past the separation zone and through a filter section which separates any remaining liquid by centrifugal forces. Materials that are hard to separate, such as soybean meal or cocoa powder, can be further separated from the liquids with packing by the screw conveyor and a hydraulically actuated pressure plate at the exit port. This is accomplished by a combination of squeezing and centrifugal forces acting on the solid material. Oils, chemical contaminants, solvents and water can be transferred to a flash tower for further separation and recovery of solvents and oils. Solids exiting the system can be transferred to a second extraction system if desired.

BRIEF DESCRIPTION OF THE DRAWINGS

The present invention will be better understood with reference to the appended drawing sheets, wherein:

FIG. 3 is a side view of the extractor of the present invention.

DETAILED DESCRIPTION

The present invention relates to a process and system for the continuous extraction of oil from oil-bearing materials. In particular, the present invention uses a combination of factors to effect a more efficient extraction process. The most important factor is based on a less familiar process called Pressure Diffusion. Instead of using a concentration gradient to effect extraction of oil from oil-bearing materials, the current process uses a pressure gradient uniquely created by the action of a centrifuge. Most centrifuges are utilized as separation devices for solvent and oil- or water-bearing materials. Current solvent extraction devices and processes rely on a concentration gradient as a means of penetrating and extracting of oil bearing materials. In the present invention, the extraction system is designed to be used with liquefied gases and/or combinations of liquid co-solvents. Liquefied gases in combination with centrifugal forces can accommodate an almost infinite range of densities and pressures to affect a very efficient and gentle extraction process. The range of pressures can be anywhere between and including subcritical and supercritical pressures. Preferably, the extraction is conducted under supercritical conditions.

Oil can be extracted from most oil-bearing materials with little modification of the extraction system of the present invention. Nonlimiting examples of oil-bearing vegetable and plant materials include rice, rice bran, cottonseed, soybean, linseed, peanut, hydrocarbon oil-producing plants, such as gopher plant and guayule, medicinal type oils such as taxol from pawpaw trees, and neem oil from neem trees. Non-limiting examples of hydrocarbon oil-containing substances are sludge, slurries, emulsions, soils, oil shale and tar sands.

Suitable solvents for use in the present invention include, for example, solvents which are normally gaseous at atmospheric temperatures as well as normally liquid solvents. Preferably, the solvents used are those which are normally gaseous at atmospheric conditions. Normally liquid solvents can be used as primary solvents or secondary solvents and/or co-solvents in combination with liquefied gaseous solvents. Nonlimiting examples of preferred solvents include methane, ethane, propane, butane, ethylene, propylene, butylene, sulfur dioxide, carbon dioxide and combinations thereof. Co-solvents include, for example, hexane, alcohols, tetrahydrofurfuryl. Preferable co-solvents include, for example, propane, butane, carbon dioxide and alcohol. The weight ratio of solvent:oil-bearing material can be in the range of about 1:1 to about 3:1 or higher, depending on extractability of the oil bearing material. Preferably, the weight ratio of solvent:oil-bearing material is from about 1:1 to about 2:1.

Figure 1:
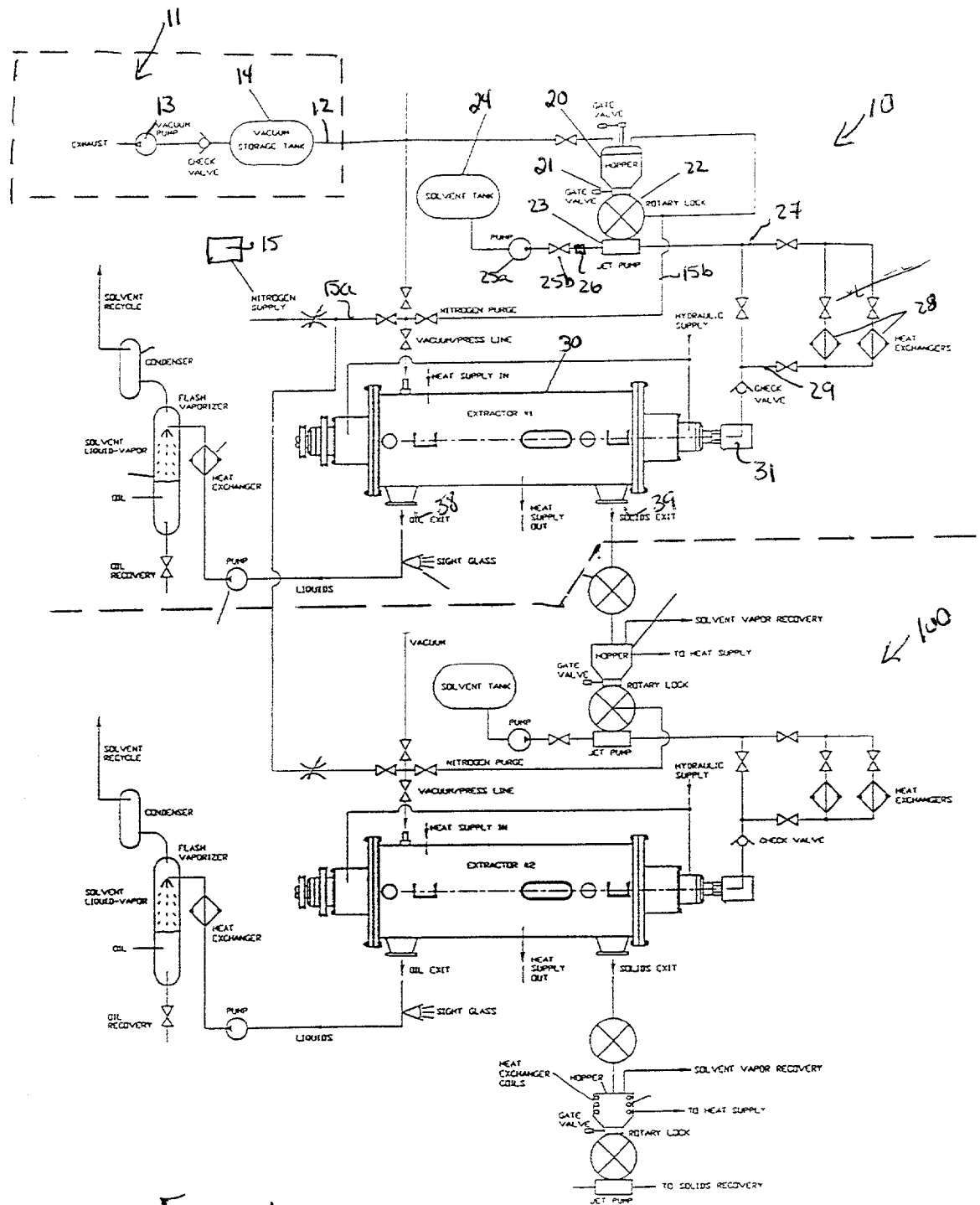
FIG. 1 is a schematic illustrating the method and system of the present invention.

The extraction system of the present invention will be better understood by reference to the figures. FIG. 1 is a schematic illustrating the overall extraction system 10 of the present invention. As shown in FIG. 1, a vacuum is applied on the entire extraction system until all oxygen is exhausted from the system by vacuum system, generally denoted 11 which includes vacuum line 12 and vacuum pump 13 and vacuum storage tank 14. Nitrogen from nitrogen supply 15 then is introduced into the system via nitrogen supply line 15a to approximately 100 psi. The nitrogen purge serves three functions. First, purging with nitrogen reduces the chance of oxygen entering into the system; second, the nitrogen purge maintains the liquefied gaseous solvents in the liquid state; and third, the nitrogen purge allows for fine tuning of pressures for subcritical or supercritical extraction.

Figure 2A:
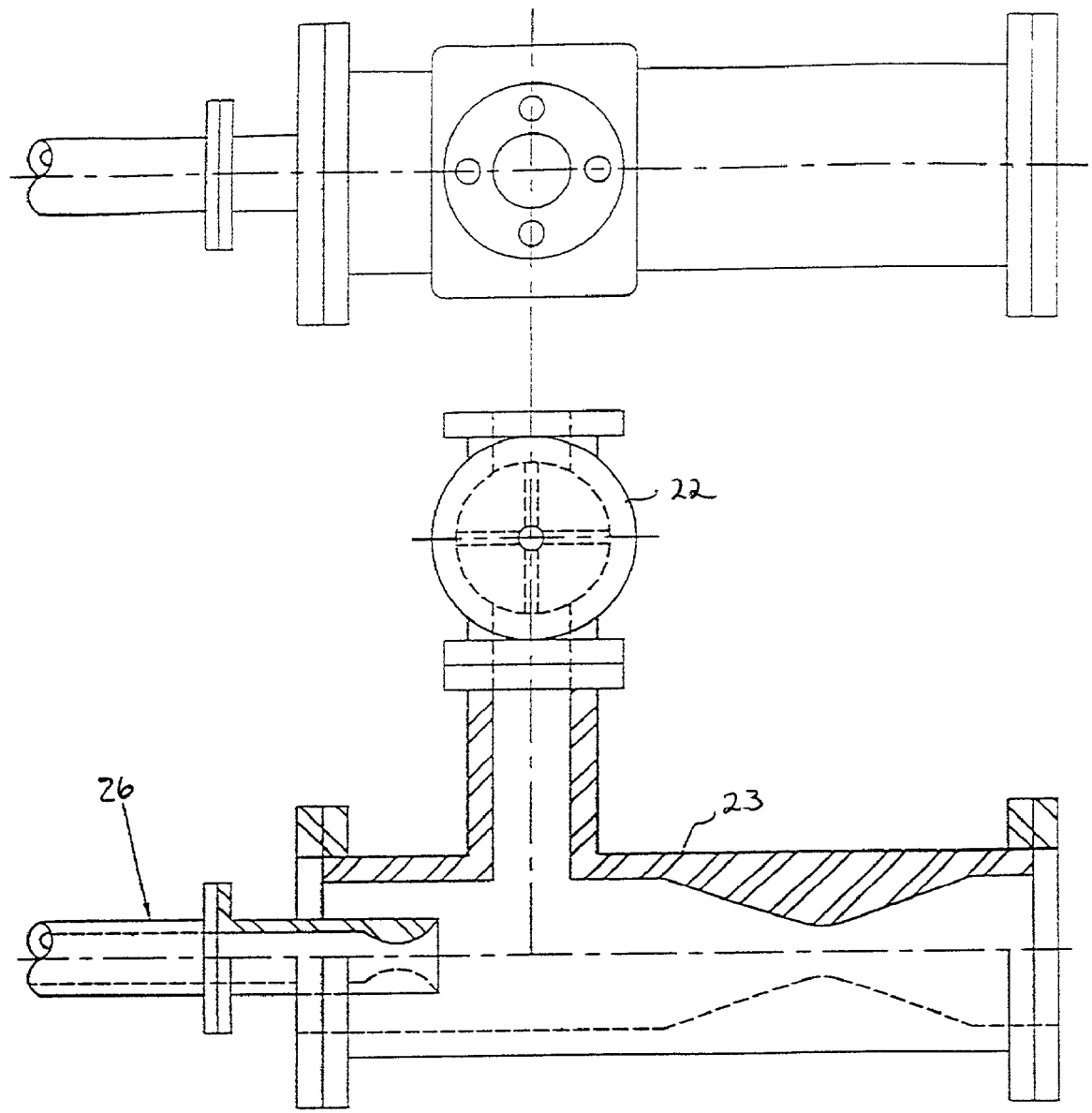
FIG. 2A is a side view illustrating a jet pump with rotary valve of the present invention.
Figure 2B:
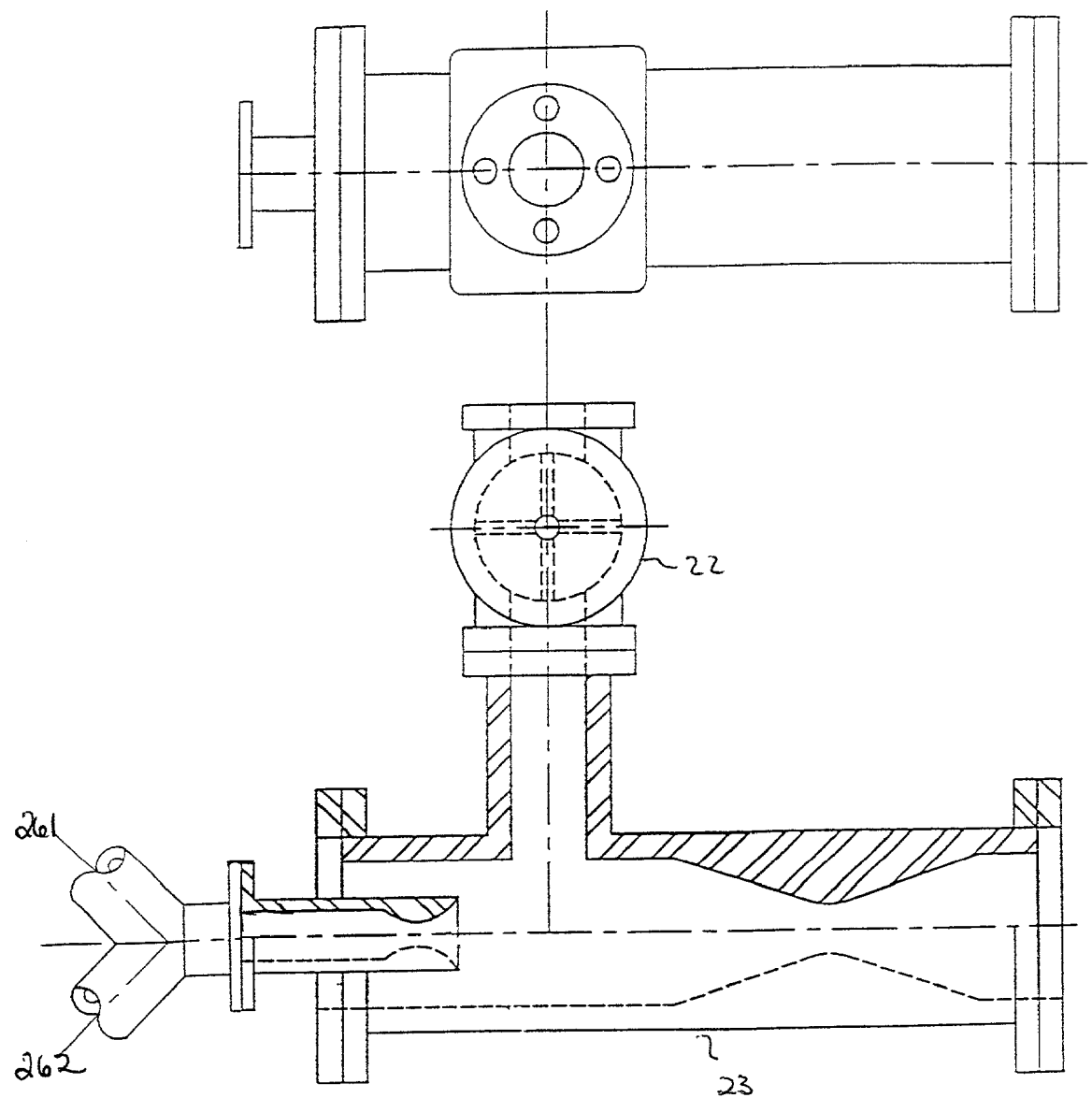
FIG. 2B is a side view illustrating a dual jet pump with rotary valve of the present invention.

If the material being extracted is a solid, such as rice and rice bran, the material is introduced into a hopper or silo 20, which also purged is by nitrogen via nitrogen supply line 15b. A gate valve 21 permits the solid material to drop from the silo to a rotary lock valve 22 which regulates the amount of solids flow into the system. The solid material is fed from the rotary lock into a jet pump mixing device 23. The primary solvent, contained within solvent tank 24, is fed via nozzle 26 into the jet pump mixing device 23 by solvent pump 25a which is controlled by solvent control valve 25b. Referring to FIG. 2A, the jet pump mixing device 23 acts as a pump and a mixing device which forces the liquefied gaseous solvent/solids mixture through the system. The jet pump mixing device 23 also creates a partial vacuum under the rotary lock valve 22 which assists in the flow of solids through the rotary lock. This mixing configuration can be arranged to mix two materials, such as soil and solvent, or a rice and solvent. In an alternative embodiment, a triple configuration comprising two nozzles 261 and 262 and a rotary lock 22 can be used to mix two liquids and a solid simultaneously, for example, a primary solvent, a co-solvent and a solids oil bearing material as shown in FIG. 2B.

The resulting solvent/oil-bearing material mixture (hereinafter sometimes referred to as "the mixture", (e.g. the liquid/solid slurry mix or liquid/liquid mix) is transferred through mixture line 27 and passed through two heat exchangers 28. The temperature of the solvent/oil-bearing material mixture is increased, decreased or cycled up and/or down depending on the material being extracted and the process parameters, including for example subcritical or supercritical conditions. The mixture is transferred via transfer line 29 to the extractor 30 via slurry inlet 31 as shown in FIG. 3 and FIG. 4D.

The extractor 30 includes a screw conveyor or feed screw 35 as shown in FIG. 3 which conveys the mixture through the extractor system. In order to facilitate an understanding of the extractor, the extractor is arranged into four sections: a liquids exit section 60 shown in FIG. 4A, an extraction or separation section 50 shown in FIG. 4B, a filter section 40 shown in FIG. 4C and an entry/slurry section 70 shown in FIG. 4D. The screw conveyor is provided with an interchangeable design configuration in order to accommodate different screw flight designs. For example, FIG. 5 shows a screw conveyor 350 which is designed for rice and rice bran extraction, comprising an extraction section 450, a slurry separation section 470, a filter section 440 and a bran removal section 480. The bran removal section 480 is designed for cereal brans such as rice brans that require removal of bran from the endosperm. It is to be understood that the configuration of the screw/blade can be any multiple blade design; preferably, the configuration includes four to eight blades. The screw conveyor 35 can be replaced with an alternate filter section or blade configuration. An adjustment nut 36 is incorporated into all feed screws to facilitate alignment of the screw inside centrifugal drum 55 as shown in FIG. 4C.

The solvent/oil-bearing material mixture exits the feed screw at port 54 and enters the centrifugal drum 55 in the extraction section 50 of the screw 35 while the centrifugal drum 55 is spinning in the range between about 100 rpms to about 4,000 rpms, thereby imposing high centrifugal forces on the solvent and oil bearing material. Since the solvent is a liquefied gas, an infinite range of pressures and densities can be derived by adjusting the rpms of the drum and static nitrogen pressures inside the containment drum 32. The containment drum 32 is the main body of extractor 30 as shown in FIG. 3. The temperature of the mixture can be adjusted by supplying heat or cooling by means of an integrated heat exchanger 58. The combination of parameters, that is adjustable temperatures, pressures and rpms, enables the technician to fine tune the extraction process from subcritical to supercritical condition, thereby creating a very efficient and gentle extraction process.

The pressure inside the spinning centrifugal drum 55 is within the range of about 100 psi to about 1000 psi, while the containment drum 32 remains at about 100 psi to about 200 psi. With this configuration, extreme mechanical stresses on the extractor 30 are reduced, in contrast with the extreme mechanical stresses associated with most prior art supercritical extraction systems having pressures which can be as high as 10,000 psi. As the oil-bearing material mixture enters into the spinning centrifugal drum 55, it is acted upon by several forces. These forces, referred to as "diffusional forces" are the static nitrogen pressure, the high centrifugal pressure and the reaction pressure from the drum, as shown in detail in FIG. 6. This combination of diffusional forces are created to penetrate the oil-bearing material. The passing of the solvent/oil-bearing material mixture through heat exchangers 28 and cycling the temperature of the mixture weakens the oil-bearing molecules, thereby allowing easier penetration of the solvent in the drum 55.

Figure 6:
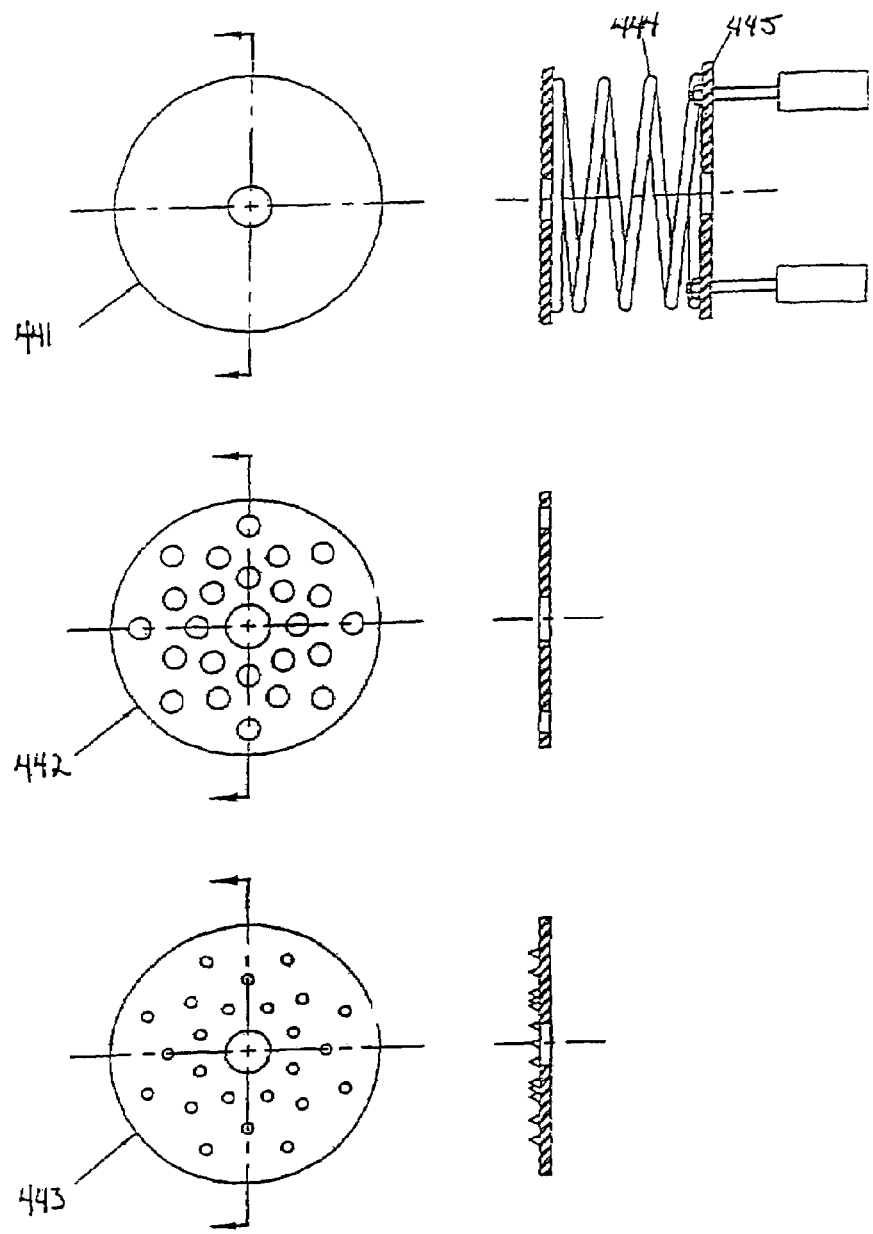
FIG. 6 is a top view of three alternative hydraulically actuated pressure plates of the present invention.

Once the solvent penetrates the oil-bearing material and attaches to the oil, the diffusional forces continue to act upon the oil and solvent or miscella to force it out of the oil-bearing material and subsequently a phase separation begins as illustrated in FIG. 6. As the miscella leaves the oil-bearing material, centrifugal forces act to create a phase separation of lighter oils/miscella at the top. Heavier oils/miscella, water if present, and solids collect at the bottom against the drum. When the oil-bearing material is a liquid, the liquid/liquid extraction process is performed essentially in the same manner, the lighter oils being extracted and separated from the heavier oils and any solid contaminates if present. Co-solvents can be introduced into the jet pump mixing device 23 to facilitate a more efficient separation at the flash tower 16.

Figure 4A:
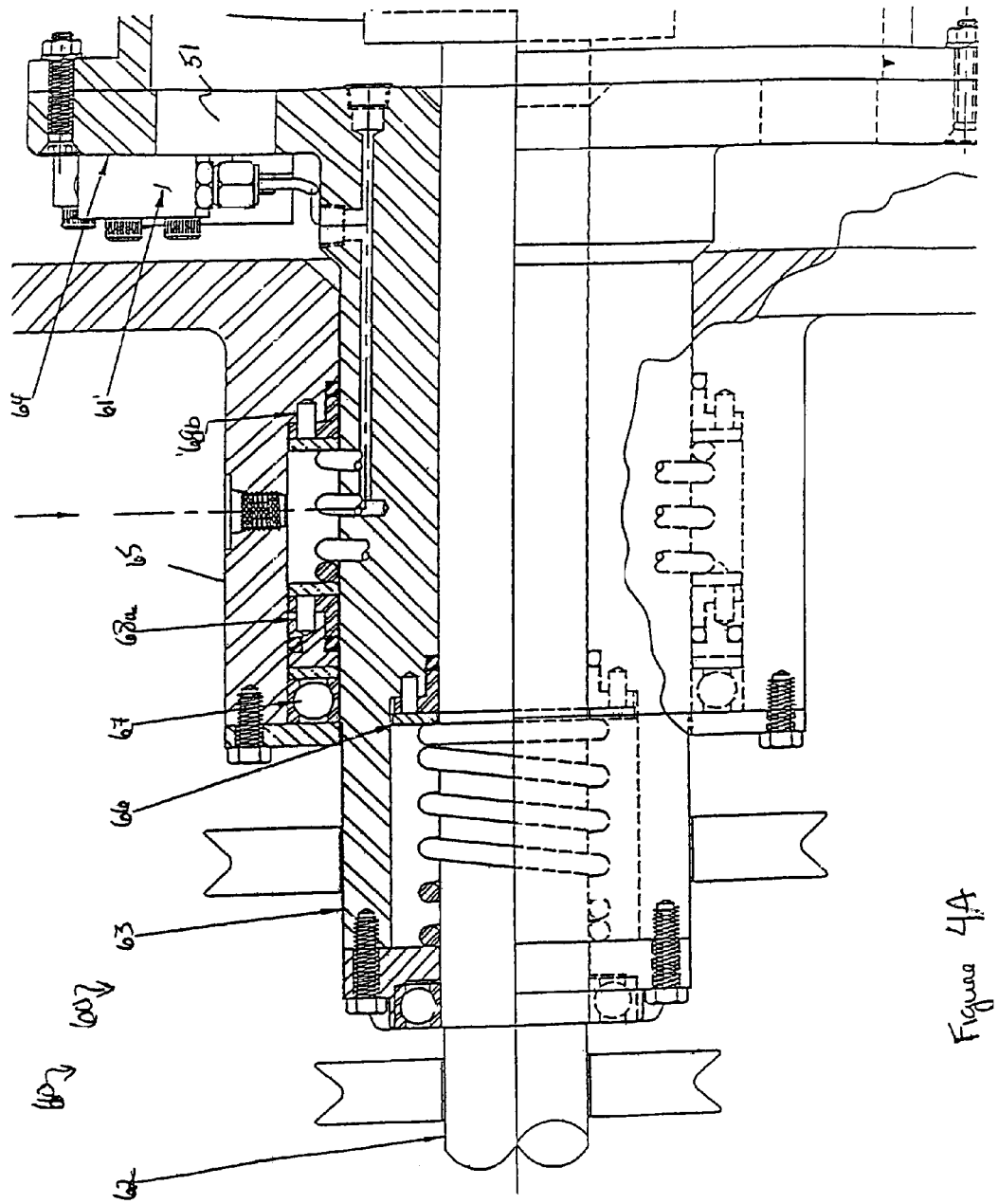
FIG. 4A is an exploded view of section I of the extractor of the present invention.
Figure 4B:
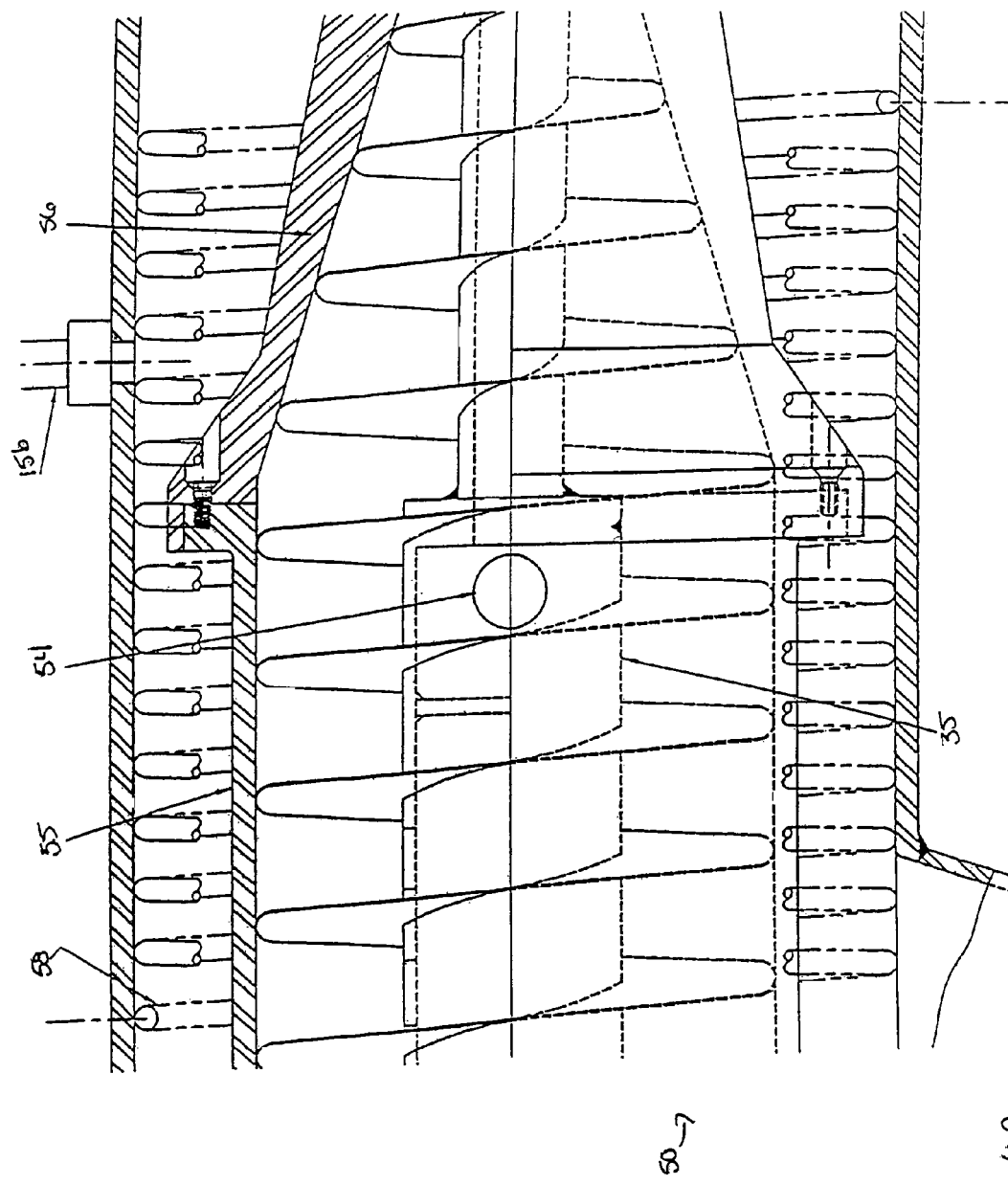
FIG. 4B is an exploded view of section II of the extractor of the present invention.
Figure 4C:
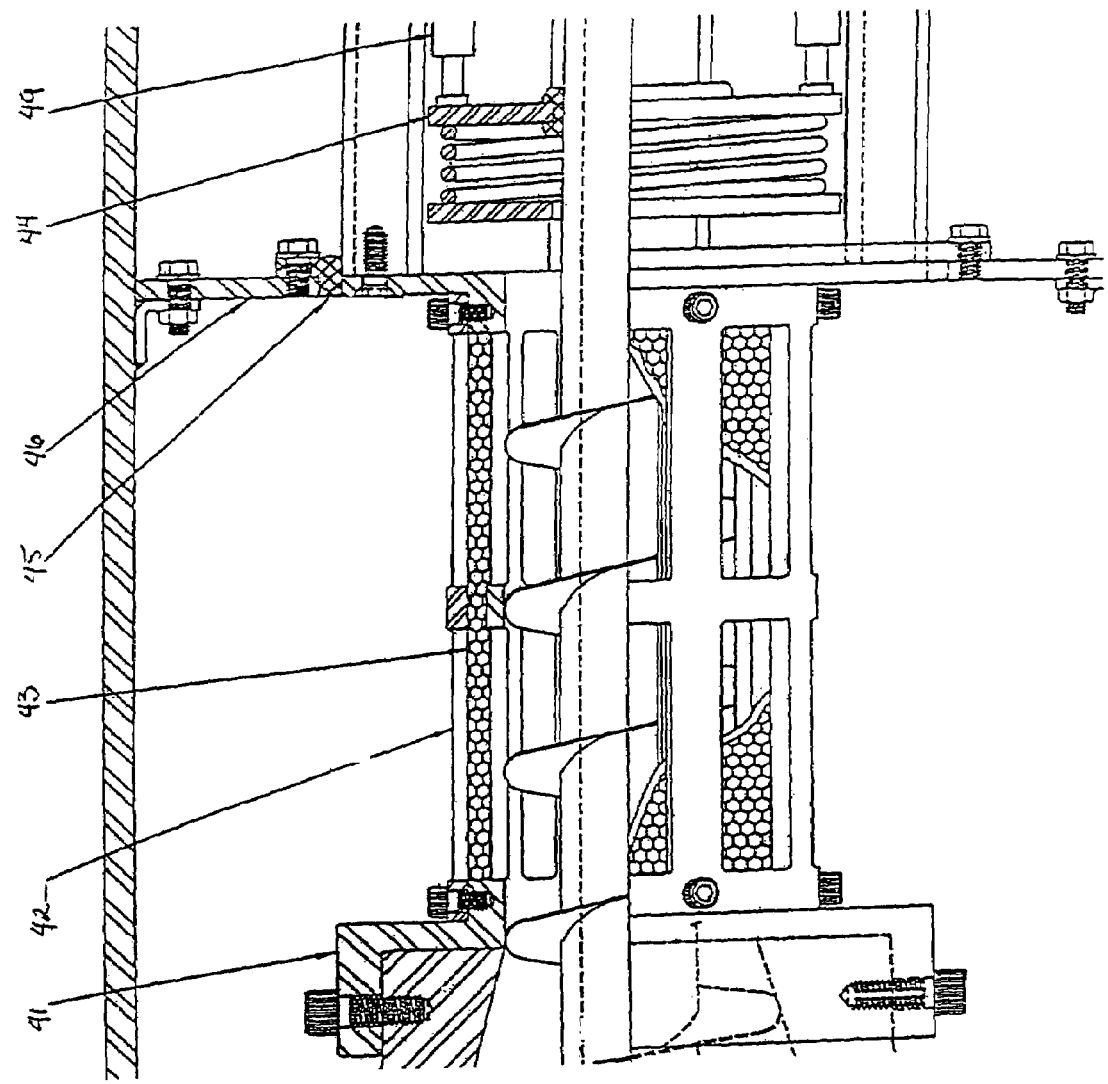
FIG. 4C is an exploded view of section III of the extractor of the present invention.
Figure 4D:
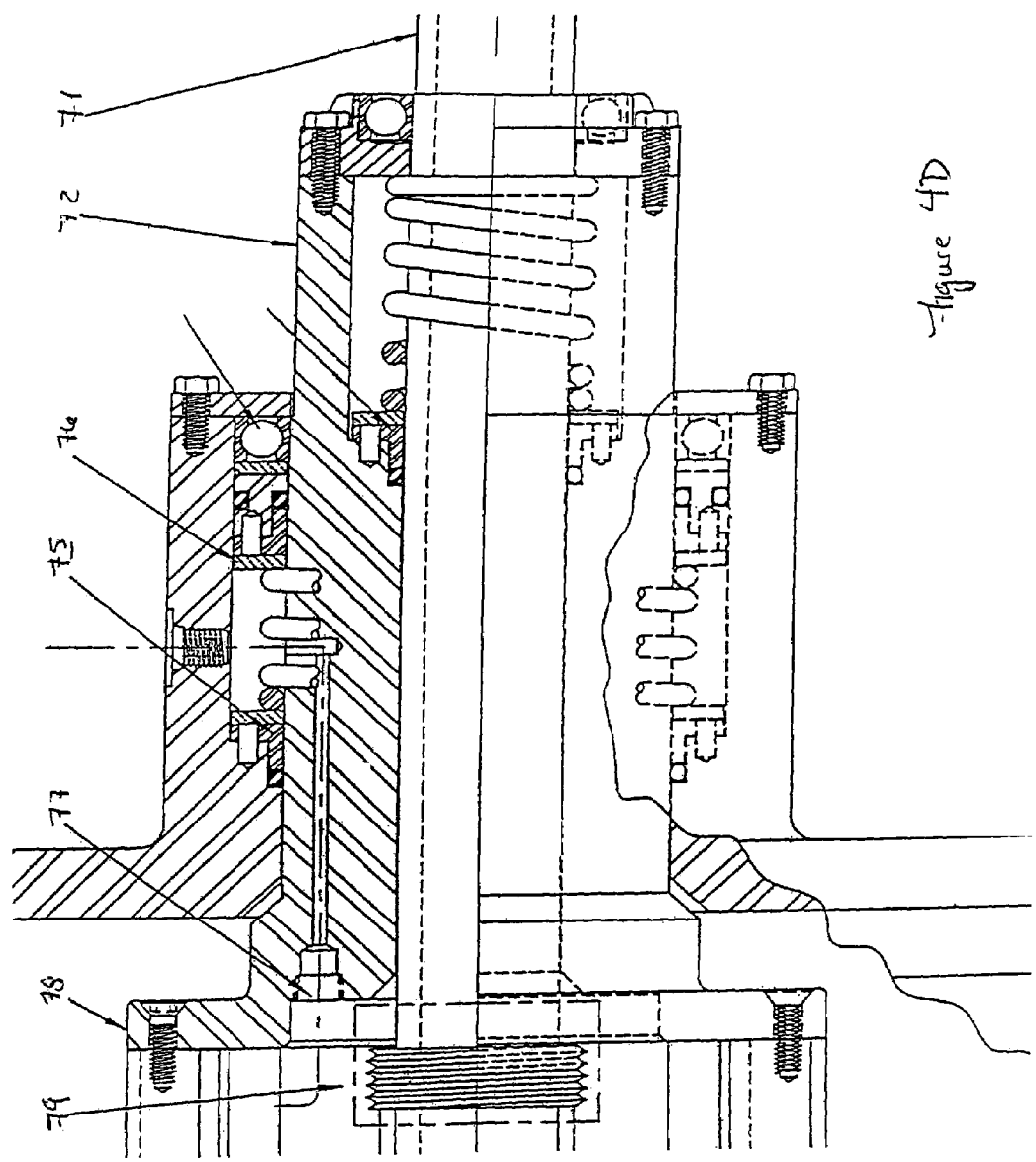
FIG. 4D is an exploded view of section IV of the extractor of the present invention.
Figure 5:
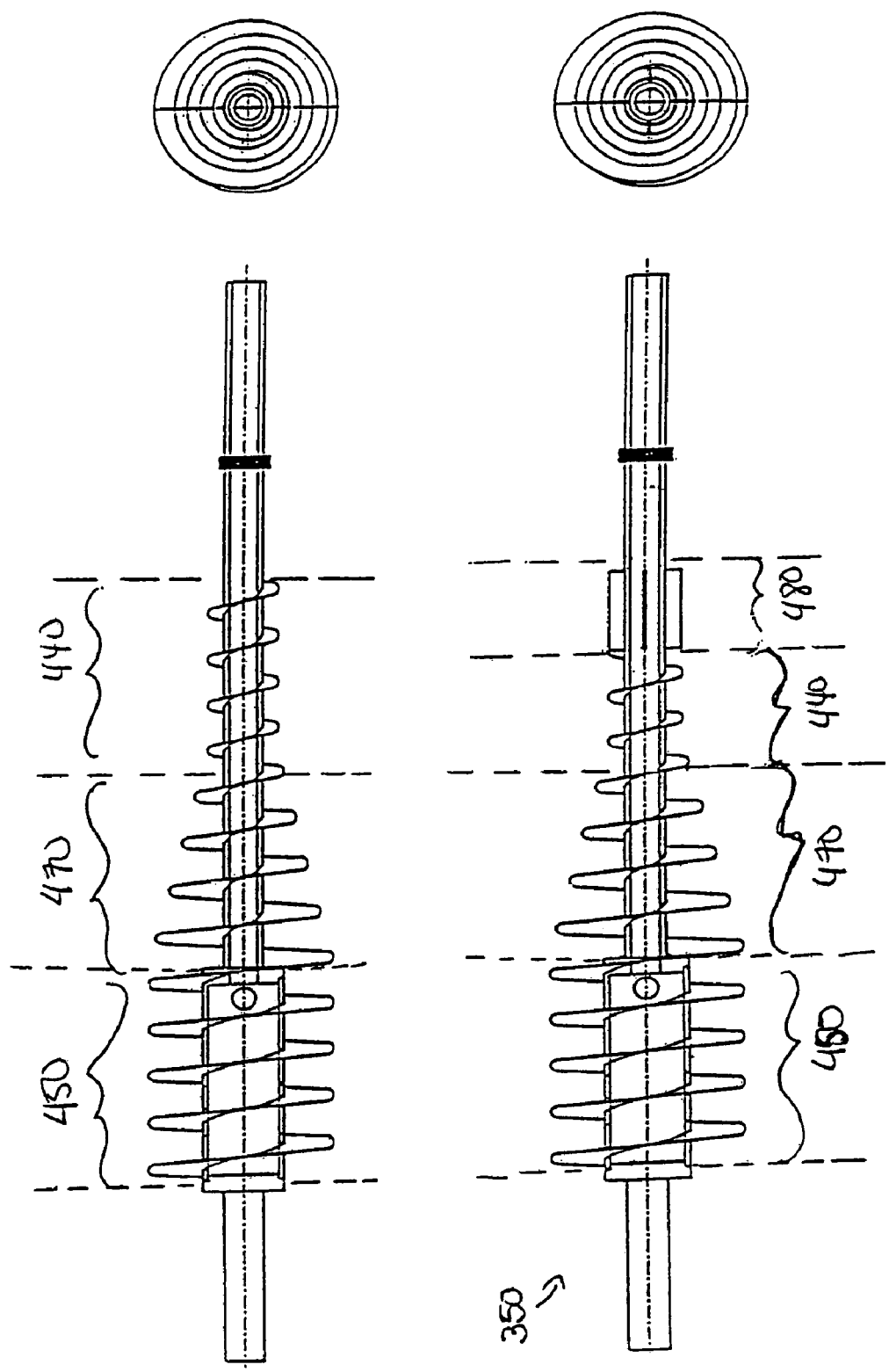
FIG. 5 is a side view of an alternative screw conveyor of the present invention.
Figure 9:
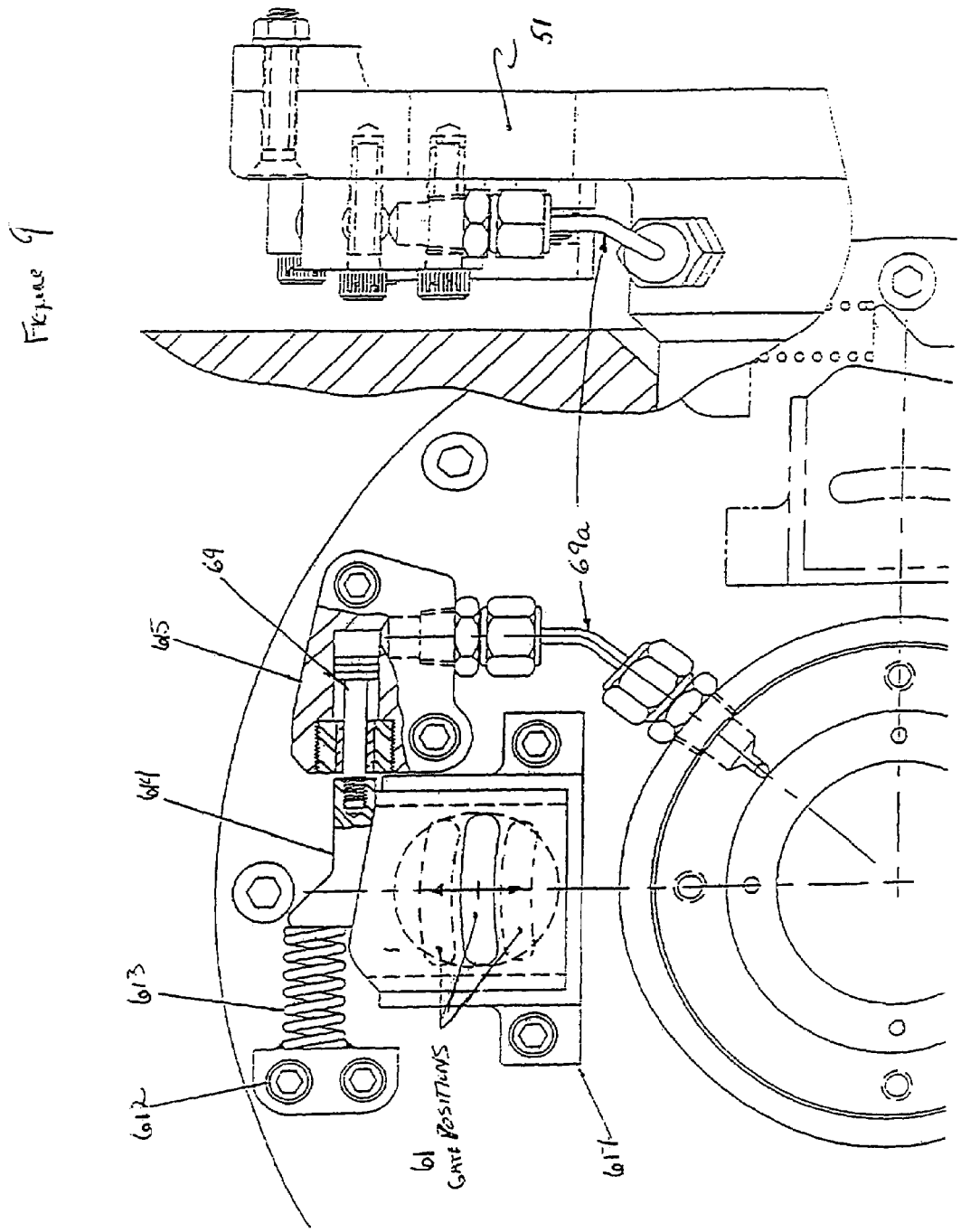
FIG. 9 is an exploded view of the solid exit port section of the present invention.

All liquids exit the drum through hydraulically actuated gates 61 disposed at the end of the drum as shown in FIG. 4A and FIG. 9. These gates 61 are hydraulic, rather than air, in order to prevent the possibility of a fire hazard. Some prior systems use an air bellows actuated gate to control the level and flow of liquids in the drum. However, an air-actuated gate will not work with the present invention due to the danger of explosion. Oil pressure travels from outside the extractor 30 to a bearing housing 65 and in between shaft 62 and shaft 63 to the end plate 64 where the hydraulic actuated gates 61 are located. As shown in FIG. 9, the gate 61 pushes against a wedge 614 by centrifugal force, when the centrifugal drum 55 is spinning. The hydraulic cylinder 69 only can push in one direction because only one hydraulic line 69a can be used. A hydraulic return line could not be incorporated into this design. When hydraulic pressure is released, the spring 613 pushes the cylinder 69 back. As long as the drum 55 is spinning, the gate 61 will press against the wedge 614. The gate is held against the opening by two guides 617. The spring 613 is held in place by the anchor 612. A compatible oil is used to control the gates and is prevented from entering the drum by mechanical seals 68a and 68b.

Main bearing 67 is located in the bearing housing 65, which is outside of the extraction section in order to prevent the solvent from extracting any lubricating oils from the bearing housing and causing bearing failure. Seal 66 is located on shaft 62 to prevent gases from leaving the extractor between shaft 62 and 63. The bearing housing at each rotary lock valve is pressurized with nitrogen to prevent any air from seeping into the feed chamber or any solvent from leaking out. A loss of nitrogen pressure at the bearing housing would indicate a bearing or seal failure. As the miscella leaves the gates and drain out of the extractor at liquids exit port 38, it is pumped to a flash tower 16 or similar device to separate the oils from the solvent or co-solvents.

Figure 8:
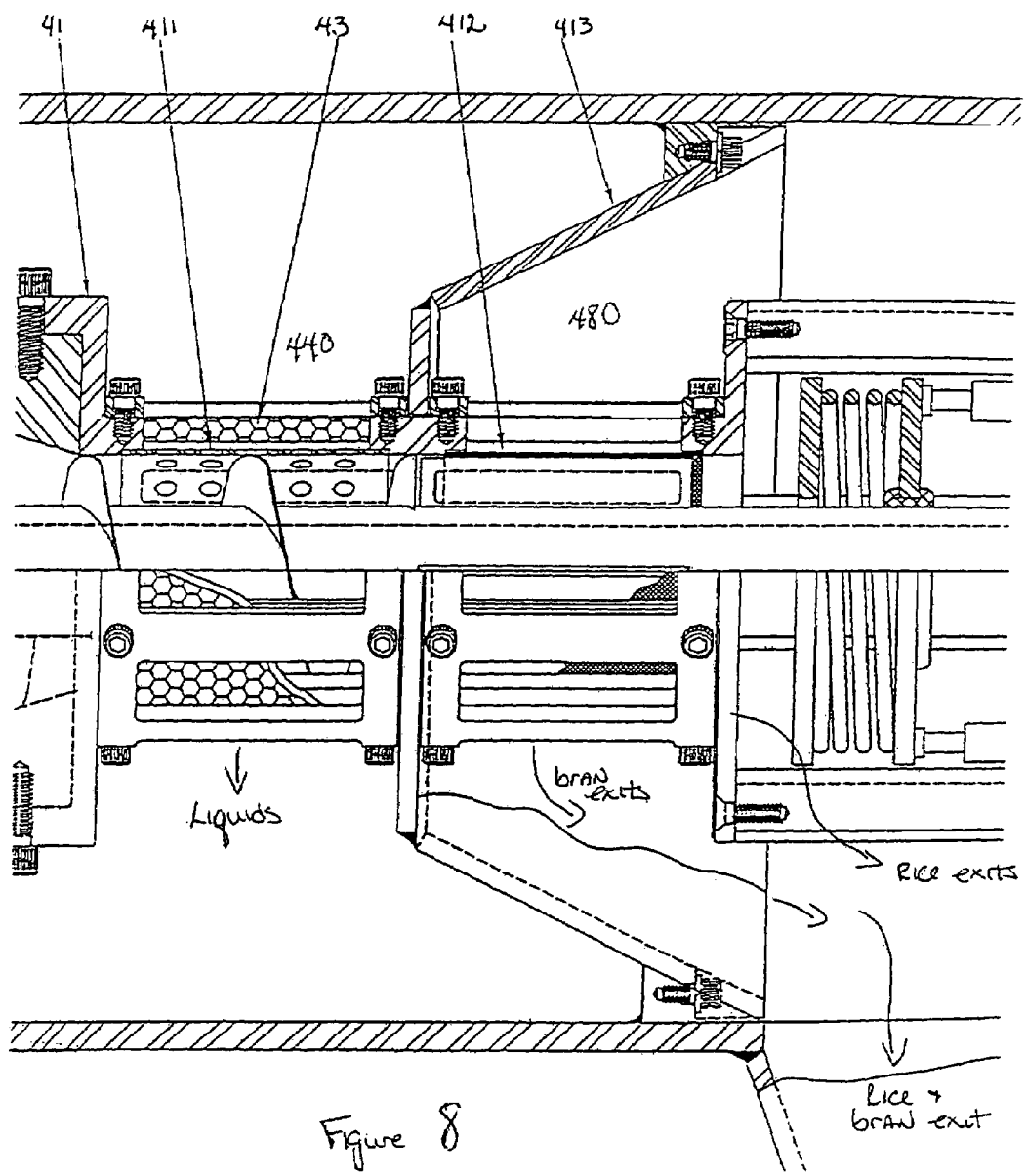
FIG. 8 is an exploded view of the filter section of the extractor of the present invention.

The feed screw 35 can continuously or intermittently turn at any combination of speed ratios related to the drum. This would depend on the nature of the oil bearing material being extracted. For instance, if it were a sludge, slurry or vegetable matter, the feed screw probably would turn at about 100 rpms compared to about 1000 rpms for a liquid/liquid extraction. The solid material is fed up a tapered cone 56 disposed in the extraction section 50 of the extractor 30 where part of the liquid is separated from the solids and continues to the filter section 40 as shown in FIGS. 3 and 4C. The filter section 40 separates the remaining liquid from the solids by high centrifugal forces since it is directly connected to the high speed centrifugal drum 55. Liquids passing through the filter 43 are prevented from remixing with the solids by means of a baffle plate 46. A clamp 42 holds the filter 43 in place. The baffle plate is sealed at the filter section by a teflon seal 45. If the material is completely dry, it continues through the filter section and to a hydraulically actuated pressure plate 44. The filter section performs several different functions: filter only at filter 43, or filter, bran removal and separation by wire mesh screen 412 as shown in FIG. 8. One type of bran is rice bran. A perforated tube 411 inside the filter housing 41 prevents the rice from clogging up the filter 43 because the holes in the perforated tube 411 are smaller than the grains of rice. For rice bran removal, the feed screw is replaced with one of several blade configurations. These blade configurations remove the bran by turning and rolling the rice against a wire mesh screen 412, thereby removing the bran from the rice. The bran falls through the screen and down a baffle plate 413 to prevent the bran from mixing with any liquid coming out of the filter 43. Additional rice is fed through the filter section 40 by action of the feed screw 35 to the bran removal section 480, forcing the white rice out at the end of the section and making room for more brown rice. Rice flowing out of the end of the bran removal section 480 is controlled by action of the hydraulically actuated pressure plate 44 as shown in FIG. 6. The action of the pressure plate also determines the amount of bran removal. The introduction of the rice at the jet pump mixing device 23 helps to loosen the bran around the rice before reaching the extractor 30. Oil is extracted from the rice before bran removal in order to prevent the action of enzymes in the bran to react with the oil and the creation of FFA.

The feed screw in the present invention not only feeds the solid material up the tapered cone 56 to separate the solids, but also functions as a pump, a mixing device, prevents packing by continuously moving solids through the extractor, breaks agglomerations, and breaks emulsions. Oil emulsions containing solids and water are broken and separated by the centrifugal forces of the centrifugal drum, along with the continuous mixing by the feed screw. The action on the oil in solution by the solvent reduces the viscosity of the solution and subsequently creates a phase separation. Solids that are hard to separate from liquids can be packed and squeezed by the action of the feed screw along with the help of the hydraulically actuated pressure plate 44 at the end of the filter section 40.

The hydraulically actuated pressure plate is designed to perform three functions. The primary function is to control the flow of solid material out of the filter section (or the bran section if rice bran is being extracted). The second function is to regulate bran removal. The third function is to pack and squeeze solid material that is hard to separate from liquids. The plate comes in three configurations as shown in FIG. 6. The first configuration is a solid plate 441 used for flow control and back pressure. The second configuration 442 is provided with a series of holes around the periphery to allow a limited amount of solids to pass through. The third configuration 443 uses pointed fingers located around the periphery to break agglomerations that might tend to stick to the end of the screw. The spring 445 and second plate 446 function together as pressure relief when speed changes and high pressures occur by the feed screw. The pressure plate 44 is fed by hydraulic pressure from outside the extractor 30 through a bearing housing 45 and between shaft 71 and shaft 72 which is part of the feed screw and continues to the end plate 78 to the hydraulic cylinders 49. A compatible hydraulic oil is prevented from entering into the extractor by mechanical seals 75 and 76. Mechanical seal 77 also prevents gases from leaving the extractor through the space between the two shafts 71 and 72. An adjustment nut 79, attached to the feed screw, is used to align the feed screw inside the drum. This nut can be reached by a hand hole on the side of the containment drum.

The solid material leaves the extractor 30 through the pressure plate 44, exits at the solid exit port 39 located at the bottom of the extractor and continues on to a nitrogen purged rotary lock valve 17. This rotary lock valve controls the flow out of the extractor and helps to maintain pressure inside the extractor. The solids pass through the rotary lock valve to a heated hopper 120. If any liquefied gaseous solvent or vapors are present, they are heated by the internal heat exchanger 128 and stripped away by vacuum and recondensed for solvent recovery. Controlled amounts of solids are allowed to pass out of the hopper by control valve A21 and rotary valve A22. The solids can be transferred to a second stage extraction system 100 or reflux back to the jet pump mixing device 23 for a second pass, depending on the efficiency of the first pass. If no second stage is necessary, the solids, for example, rice and rice bran, are transferred to a classifier for separation and subsequently to storage. Previous processes for crude rice bran oil (CRBO) extractions after separation needed to be chilled (freeze fractionated) to separate out any gums that might be present after extraction. A unique feature of the present invention is the tunability of the process parameters along with the selection of solvents allowing the operator to selectively leave in the gums and phosphatides in the bran, and thus producing a purer rice oil. Thus, the CRBO would not need to be chilled, lowering the cost of storage.

In the process of the present invention, oil can be extracted from most oil-bearing materials, as will be discussed in the following two embodiments. In the first embodiment, the oil-bearing material is rice and rice bran. Rice oil obtained from extraction of rice and rice bran is considered an excellent frying oil with a long shelf life. Rice bran results from the milling of the dwelled brown rice grains, abrasively removed from the grain, leaving the polished white rice. This abrasive action results in the formation of free fatty acids (FFA) within hours of milling.

Therefore, stabilization of the rice bran is necessary due to the high oil content of the bran. Rice bran also has a tendency to agglomerate into large granules making it difficult to stabilize.

Brown rice is introduced into the extraction system 10 from the silo 20, through the rotary lock 22 and then into jet pump 23. A liquefied gaseous solvent contained in solvent tank 24 is introduced into the jet pump 23 via jet nozzle 26 and intimately mixed with the rice. In an alternate embodiment, liquid stabilizers such as ethanol can be introduced into the system through the dual nozzle configuration shown in FIG. 2B. The rice and solvent mixture pass through heat exchangers 28 to raise the temperature of the mixture up to near supercritical temperatures. It should be noted that the solvent does not necessarily have to be pure solvent. The addition of a small amount of rice oil in the solvent can assist in loosening the bran, thereby making it easier to remove the bran later in the process. The rice and solvent mixture is transferred to the extractor 30 which is pressurized by nitrogen to maintain the solvent in the liquid state and also heated by the integrated heat exchanger 58 to maintain the temperature. Although the temperature and pressure is usually set during continuous processing, a unique feature of this invention is to allow the temperature and pressure to be changed in order to accommodate different processing conditions. The rice and solvent mixture enter into the extractor 30 through the feed screw 35 and continue into the rotating centrifugal drum 55. The drum rotates between 100 rpms to 4,000 rpms, rotation being limited to the diameter of the drum and the material being processed. The high centrifugal forces created by the rotation of the drum can be from about 100 psi up to and including about 1,000 psi. As previously discussed, nitrogen pressure can be increased along with the temperature inside the extractor to bring conditions to supercritical.

Figure 7:
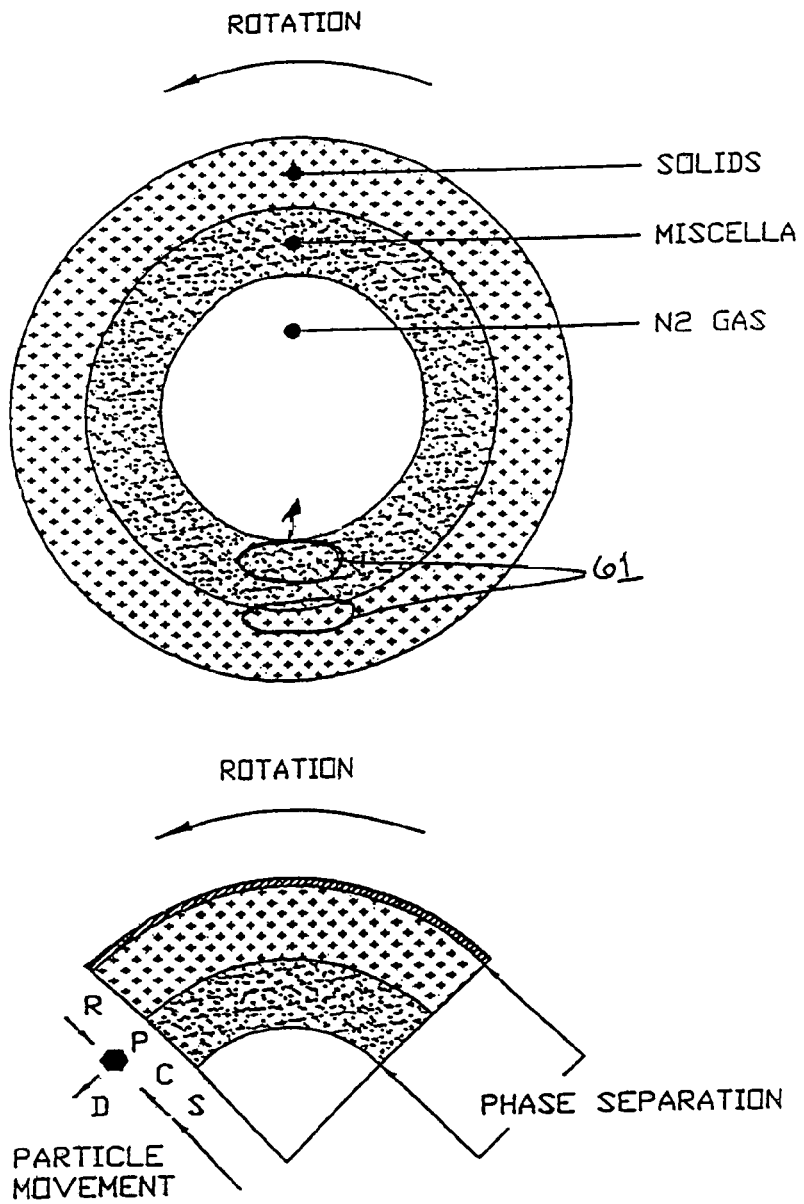
FIG. 7 is an illustration of the phase separation occuring in the centrifugal drum of the present invention.

A pressure gradient is created by this combination of high centrifugal forces and static nitrogen pressure along with temperature increases. Pressure diffusion at supercritical conditions allows easier penetration of the solvent into the cells of oil bearing nuts and seeds, thus allowing nuts and seeds such as peanuts, almonds, rice etc. to be extracted as whole grains. A phase separation takes place continuously during the extraction process with the brown rice being forced against the wall of the drum while heavier and lighter oils are above and finally the miscella or solvent oil mix at the top, as shown in FIG. 7. Different positioning of the gate at the exit port 51 will determine what mixtures leave the extractor and also determines the liquid level in the centrifugal drum 55 as shown in FIGS. 7 and 9. The brown rice being freed of oil and the bran loosened by the solvent, continue up the tapered cone 56 to be drained of liquids. Continuing on to the filter section 40, the brown rice is completely free of liquids. The brown rice enters the bran removal section 480 where the bran is removed by a series of blades that rotate the rice against a wire mesh screen 412. The bran falls through the screen while the white rice is continuously pushed out of the bran removal section 480 by incoming brown rice. Rice flowing into the filter section 40 is regulated by the rotating speed of the feed screw 35 and flow out of the filter section is regulated by the hydraulically actuated pressure plate 44 that creates a back pressure against the white rice.

Unique to this extractor is the solvent extraction of the rice by pressure diffusion at supercritical conditions and the separation of the rice from the bran. This extraction accomplishes two things. First, and most significantly, is the elimination of free fatty acids since the oil in the bran has been previously extracted. This is a major cost savings to the oil refiner since the separation of free fatty acids is time consuming and expensive. Second, the bran does not have the tendency to agglomerate since there is no oil to help bind the bran into large granules. Essentially, the bran is left as a powder to be separated from the white rice by classifier. As a result, less bleaching clay is needed since the bran is not pressure stabilized, thereby resulting in significant cost savings. Depending on the temperature and pressure of the extractor, the oils can be selectively extracted due to the ability to fine tune these parameters. If desired, gums and phosphatides can be selectively left in the bran. This reduces the cost and time needed to separate these undesirable components in the oil by the rice oil refiner.

The second embodiment of the present invention illustrates the extraction of oil from a contaminated soil. The process requires very little modification to the extractor system used in the the first embodiment. It is well known that soil contamination is a serious problem in all developed and developing countries. There are many ways to attempt soil remediation, most of which result in removing the soil to be processed elsewhere. Incineration is the most common type of process. There are processes that attempt to decontaminate the soil on site as mentioned previously in U.S. Pat. No. 4,977,839 to Fochtman et al. The Fochtman et al. process attempts to heat the soil to high temperatures to vaporize the organic pollutants then condense these vapors back to liquid form. This is a dangerous process due to the inherent flammabilities and high temperatures involved.

The present invention can decontaminate most soils on site and at low temperature. Preferred types of contaminates include, for example, gasoline, diesel fuel, and used motor oils. These contaminants are the most common type of pollutants and typically can be found at abandoned gas stations across the United States. The depth of the contamination is first determined before any soil is removed. Top soil not contaminated is removed until the depth of the contamination is located. Rocks, concrete, metals, roots and the like are separated before any soil is introduced into the extractor. The soil first is introduced into a hopper through rotary air locks then into the nitrogen purged silo 20. The soil then is gravity fed through the gate valve 21 to rotary lock 22 and jet pump 23. Jet nozzle 26 introduces a liquefied gaseous solvent contained in solvent tank 24 into the jet pump 23 and intimately mixes the solvent with the contaminated soil. Suitable examples of preferred liquified gaseous solvents include propane, butane, pentane, carbon dioxide and mixtures thereof. Depending on the type of contaminates in the soil, skilled practitioners in the art will be able to determine the best combination for the application.

The nozzle configuration is important since large amounts of soil contamination are in the form of slurries or emulsions. For example, drilling muds discharged from oil drilling rigs are stored on site in a mud containment pond to be decontaminated later or reinjected into the well. The dual nozzle configuration can be used here, in this manner bypassing the rotary lock valve. The sludge or slurry can be injected along with the solvent and intimately mixed before continuing on to the heat exchangers 28. The heat exchangers raise the solvent/oil-bearing material mixture up to the desired operating temperature, preferably subcritical temperature, before entering the extractor 30.

The extractor 30 is similar in design configuration except that the bran removal section with the wire mesh screen and the blade configuration are not necessary. The rpms of the centrifugal drum 55, along with static nitrogen pressure and temperature can be increased to bring the solvent to supercritical conditions to produce a most efficient process resulting in complete decontamination of the soil. Pressure diffusion takes place in combination with supercritical conditions of the solvent. As discussed previously, the extractor 30 functions as a pump and a mixing device, breaking up any large agglomerations. The high rpms of the rotating centrifugal drum and the supercritical conditions inside the extractor, in combination with the change of viscosity of the slurry or emulsion by the solvent, act to break any emulsion, resulting in a phase separation. The extracted soil continues through the extractor 30, up the cone 56, to the filter section 40 where any remaining liquid is separated from the soils by centrifugal forces. Difficult to separate liquids can be pressed out of the soil by the hydraulically actuated pressure device 44. Extremely difficult to separate contaminated soils can be sent to a second stage extraction system 100 to be further processed.

While particular embodiments of the invention have been described, it will be understood, of course, that the invention is not limited thereto, and that many obvious modifications and variations can be made, and that such modifications and variations are intended to fall within the scope of the appended claims.

What is claimed is:

1. A process for continuously extracting oil from oil-bearing materials in an extraction system, said process comprising:
   (a) removing air from the extraction system;
   (b) introducing an inert gas into said extraction system at a pressure sufficient to maintain a normally gaseous solvent in liquid state;
   (c) introducing an oil-bearing material into a silo;
   (d) passing said oil-bearing material from said silo to a jet pump mixing device;
   (e) introducing a liquified normally gaseous solvent into said jet pump mixing device;
   (f) mixing said oil-bearing material and said solvent in said jet pump mixing device for a time sufficient to permit complete wetting of oil-bearing material by said solvent to form a mixture;
   (g) heating said mixture to near supercritical conditions;
   (h) passing said mixture through an extractor having a screw conveyor adapted to rotate at a first rpm range and a centrifugal drum adapted to rotate at a second rpm range;
   (i) treating said mixture within said extractor in such a manner that supercritical temperature and pressure are attained, wherein treating said mixture includes a combination of increasing the rpms of the centrifugal drum, increasing the temperature inside the extractor and increasing the inert gas pressure inside the extractor;
   (j) extracting oil from said mixture by pressure diffusion provided by the combination of increased rpms, increased temperatures and increased inert gas pressures at supercritical conditions;
   (j) removing liquids extracted from said mixture through a liquids exit port, and
   (k) removing solids extracted from said mixture through a solids exit port.

2. The process in accordance with claim 1, wherein said inert gas is selected from the group consisting of nitrogen and carbon dioxide.

3. The process in accordance with claim 1, wherein said oil-bearing material is a liquid material selected from the group consisting of hydrocarbon-containing sludges, hydrocarbon-containing slurries, oil-containing liquid and oil emulsions.

4. The process in accordance with claim 1, wherein said oil-bearing material is a solid material selected from the group consisting of oil-contaminated soil, organic chemical-contaminated soil and oil-containing vegetable matter.

5. The process in accordance with claim 1, wherein said liquified normally gaseous solvent is selected from the group consisting of propane, butane, pentane, carbon dioxide, and mixtures thereof.

6. The process in accordance with claim 5, further comprising a co-solvent selected from the group consisting of tetrahydrofurural, propanol, and alcohol.

7. The process in accordance with claim 3, wherein said oil-bearing liquid material is introduced to said jet pump mixing device through a first nozzle of a dual jet pump configuration and said solvent is introduced to said jet pump mixing device through a second nozzle of a dual jet pump configuration.

8. The process in accordance with claim 6, wherein said liquified normally gasous solvent is introduced to said jet pump mixing device through a first nozzle of a dual jet pump configuration and said co-solvent is introduced to said jet pump mixing device through a second nozzle of a dual jet pump configuration.

9. The process in accordance with claim 1, wherein said extractor comprises
   (a) an extraction section containing said centrifugal drum, an integrated heat exchanger, a containment drum and a tapered cone;
   (b) a filter section in communication with said extraction section by means of said tapered cone and comprising at least one filtering means and a least one baffle plate adapted to separate liquids and solids;
   (c) a solids exit section, and
   (d) a liquids exit section.

10. The process in accordance with claim 9, wherein said at least one filtering means is an interchangeable filtering means including an interchangeable filter and an interchangeable filter/bran removal screen combination.

11. The process in accordance with claim 9, wherein said screw conveyor is an interchangeable screw conveyor adapted to receive different flight configurations, different flight and blade configurations and multiple blade configurations.

12. The process in accordance with claim 1, wherein each of said liquids exit port and solids exit port is controlled by a hydraulically actuated pressure mechanism.

13. The process in accordance with claim 12, wherein material flow for liquids is controlled by hydraulically actuated gates disposed on said centrifugal drum and wherein material flow for solids is controlled by a hydraulically actuated pressure plate and pressure relief mechanism.

14. The process in accordance with claim 1, wherein the rpm rotation of said centrifugal drum and said screw conveyor can be changed in combination, independently and intermittently.

15. The process in accordance with claim 1, wherein said extracted liquids removed through said liquid exit port are in the form of an oil-solvent mix, further comprising transferring said oil-solvent mix to a flash tower, stripping solvent from the oil, transferring stripped solvent to storage and collecting said oil.

16. The process in accordance with claim 1, wherein said extracted solids removed through said solid exit port are introduced into a heated hopper, subjecting said heated hopper to a vacuum, stripping gaseous vapors from the solids and drying and collecting the solids.

17. A process for continuously extracting oil from brown rice in an extraction system, said process comprising:
(a) removing air from the extraction system;
(b) introducing an inert gas into said extraction system at a pressure sufficient to maintain a normally gaseous solvent in liquid state;
(c) introducing said brown rice into a silo;
(d) passing said brown rice to a jet pump mixing device;
(e) introducing a liquified normally gaseous solvent into said jet pump mixing device;
(f) mixing said oil-bearing material and said solvent in said jet pump mixing device for a time sufficient to permit complete wetting of said brown rice by said solvent to form a mixture;
(g) heating said mixture to near supercritical conditions;
(h) passing said mixture through an extractor having a screw conveyor adapted to rotate at a first rpm range, a centrifugal drum adapted to rotate at a second rpm range, a tapered cone, a filtering section and a bran removal section;
(i) treating said mixture within said extractor in such a manner that supercritical temperature and pressure are attained, wherein treating said mixture includes a combination of increasing the rpms of the centrifugal drum, increasing the temperature inside the extractor and increasing the inert gas pressure inside the extractor;
(j) extracting oil from said mixture by pressure diffusion provided by the combination of increased rpms, increased temperatures and increased inert gas pressures at supercritical conditions;
(j) removing liquids extracted from said mixture through a liquids exit port;
(k) transferring said mixture containing said brown rice up said tapered cone and to a filtering section by action of said screw conveyor in such a manner that said brown rice is drained of most liquids and removing any remaining liquids by centrifugal forces;
(l) passing said mixture containing brown rice to said bran removal section and rubbing said rice against a wire mesh screen contained within said bran removal section by using a blade configuration on said screw conveyor in such a manner that bran is removed from the endosperm resulting in bran and white rice, wherein bran falls through said wire mesh screen and down a baffle plate and white rice exits the extractor via a solids exit port;
(k) removing solids extracted from said mixture through a solids exit port.

18. The process in accordance with claim 17, wherein said extracted liquids removed through said liquid exit port are in the form of an oil-solvent mix, further comprising transferring said oil-solvent mix to a flash tower, stripping solvent from the oil, transferring stripped solvent to storage and collecting said oil.

19. The process in accordance with claim 17, wherein said bran and white rice are introduced into a heated hopper, subjecting said heated hopper to a vacuum, stripping gaseous vapors from the solids and drying and collecting the solids.

20. The process in accordance with claim 17, wherein said rice and rice bran are pre-softened prior to bran removal with solvent containing up to 2% rice oil.

21. The process in accordance with claim 18, wherein the said rice and rice bran are stabilized by extracting oil prior to bran removal and by injecting a food grade stabilizer into the rice-solvent mixture at the jet pump mixing device.

22. The process in accordance with claim 9, said extractor further comprises a hydraulically actuated pressure plate provided with a plurality of apertures which is adapted to squeeze solids contained within the mixture in order to help remove liquids at the filter section.

23. The process in accordance with claim 22, wherein said hydraulically actuated pressure plate further is provided with fingers to help break agglomerations.

24. The process in accordance with claim 22, further comprising a second plate mechanically attached to said hydraulically actuated pressure plate by a spring configuration adapted to be utilized as pressure relief during speed rotation changes of the drum and screw conveyor.

25. The process in accordance with claim 17, said extractor further comprises a hydraulically actuated pressure plate provided with a plurality of apertures which is adapted to squeeze solids contained within the mixture in order to help remove liquids at the filter section.

26. The process in accordance with claim 25, wherein said hydraulically actuated pressure plate further is provided with fingers to help break agglomerations.

27. The process in accordance with claim 25, further comprising a second plate mechanically attached to said hydraulically actuated pressure plate by a spring configuration adapted to be utilized as pressure relief during speed rotation changes of the drum and screw conveyor.

* * * * *